United States Patent
Lasich

(10) Patent No.: US 10,404,204 B2
(45) Date of Patent: Sep. 3, 2019

(54) STORAGE OF SOLAR ENERGY

(71) Applicant: Raygen Resources Pty Ltd, Malvern, Victoria (AU)

(72) Inventor: John Beavis Lasich, Balwyn (AU)

(73) Assignee: Raygen Resources Pty Ltd, Malvern, Victoria (AU)

( * ) Notice: Subject to any disclaimer, the term of this patent is extended or adjusted under 35 U.S.C. 154(b) by 0 days.

(21) Appl. No.: 14/910,634

(22) PCT Filed: Aug. 7, 2014

(86) PCT No.: PCT/AU2014/000795
§ 371 (c)(1),
(2) Date: Feb. 5, 2016

(87) PCT Pub. No.: WO2015/017893
PCT Pub. Date: Feb. 12, 2015

(65) Prior Publication Data
US 2016/0352282 A1    Dec. 1, 2016

Related U.S. Application Data

(60) Provisional application No. 61/863,222, filed on Aug. 7, 2013.

(51) Int. Cl.
*H02S 10/20* (2014.01)
*F01D 15/08* (2006.01)
(Continued)

(52) U.S. Cl.
CPC ............... *H02S 10/20* (2014.12); *F01D 5/02* (2013.01); *F01D 15/08* (2013.01); *F01D 15/10* (2013.01); *F03G 6/001* (2013.01); *F03G 6/064* (2013.01); *F24S 20/20* (2018.05); *F24S 23/00* (2018.05); *F28D 20/00* (2013.01); *H02K 7/1823* (2013.01);
(Continued)

(58) Field of Classification Search
CPC .... H02K 10/20; H02K 7/1823; H02S 40/425; H02S 10/00; F01D 5/02; F01D 15/08; F01D 15/10; F03G 6/001; F03G 6/064; F24J 2/06; F24J 2/07; F28D 20/00; F28D 20/0056; F28D 2020/0047; F28D 2020/006; F05D 2220/30; Y02E 10/41; Y02E 10/44;
(Continued)

(56) References Cited

U.S. PATENT DOCUMENTS 4,079,591 A * 3/1978 Derby ............... F03G 6/065
                                              60/641.8
4,370,559 A * 1/1983 Langley, Jr. ......... F03G 6/001
                                              136/291

(Continued)

OTHER PUBLICATIONS

International Search Report dated Oct. 21, 2014, directed to International Application No. PCT/AU2014/000795, 3 pages.

*Primary Examiner* — Julio C. Gonzalez
*Assistant Examiner* — Joseph Ortega
(74) *Attorney, Agent, or Firm* — Morrison & Foerster LLP

(57) ABSTRACT

A method of operating a solar energy plant includes storing solar energy in a compressed air system of the plant by converting solar energy into electrical energy which operates a compressor of the compressed air system and produces compressed air and/or using solar energy as thermal energy that heats compressed air in the compressed air system of the plant.

8 Claims, 4 Drawing Sheets

(51) Int. Cl.
*F01D 15/10* (2006.01)
*F01D 5/02* (2006.01)
*H02K 7/18* (2006.01)
*H02S 40/42* (2014.01)
*H02S 10/00* (2014.01)
*F03G 6/06* (2006.01)
*F28D 20/00* (2006.01)
*F03G 6/00* (2006.01)
*F24S 23/00* (2018.01)
*F24S 20/20* (2018.01)

(52) U.S. Cl.
CPC ............ *H02S 10/00* (2013.01); *H02S 40/425* (2014.12); *F05D 2220/30* (2013.01); *F28D 20/0056* (2013.01); *F28D 2020/006* (2013.01); *F28D 2020/0047* (2013.01); *Y02E 10/41* (2013.01); *Y02E 10/44* (2013.01); *Y02E 10/46* (2013.01); *Y02E 10/50* (2013.01); *Y02E 60/142* (2013.01); *Y02E 70/30* (2013.01)

(58) Field of Classification Search
CPC ....... Y02E 10/46; Y02E 10/50; Y02E 60/142; Y02E 70/30
See application file for complete search history.

(56) References Cited

U.S. PATENT DOCUMENTS

| | | | | |
|---|---|---|---|---|
| 5,578,140 | A * | 11/1996 | Yogev | G02B 26/08 136/246 |
| 2007/0157614 | A1* | 7/2007 | Goldman | F02C 3/22 60/641.15 |
| 2009/0230696 | A1 | 9/2009 | Enis et al. | |
| 2011/0168234 | A1* | 7/2011 | Lasich | H01L 31/02008 136/246 |
| 2013/0048054 | A1* | 2/2013 | Schoen | F03G 6/065 136/248 |
| 2013/0207402 | A1* | 8/2013 | Bronicki | F03G 6/064 290/1 R |
| 2013/0257056 | A1* | 10/2013 | Ma | F03G 6/065 290/52 |
| 2014/0305124 | A1* | 10/2014 | Kobayashi | F24S 10/742 60/641.11 |
| 2014/0360188 | A1* | 12/2014 | Harada | F02C 7/275 60/641.14 |
| 2015/0000278 | A1* | 1/2015 | Furutani | F03G 6/06 60/641.15 |
| 2015/0090251 | A1* | 4/2015 | Magaldi | F03G 6/06 126/714 |

* cited by examiner

STORAGE OF SOLAR ENERGY

CROSS-REFERENCE TO RELATED APPLICATIONS

This application is a national stage application under 35 U.S.C. 371 of International Patent Application No. PCT/AU2014/000795, filed Aug. 7, 2014, which claims the priority of U.S. Provisional Application No. 61/863,222, filed Aug. 7, 2013, the contents of which are incorporated herein by reference in their entirety.

FIELD OF THE INVENTION

The present invention relates to storing solar energy.

BACKGROUND OF THE INVENTION

The intermittent nature of solar energy is a major barrier to widespread use of solar energy.

There has been considerable research and development work in the area of storing solar energy. Options considered for solar energy storage include chemical storage batteries, pumped hydro systems, and thermal storage using a heat transfer medium (such as molten salt).

Chemical storage batteries, while technically able to provide storage, are too expensive for large scale use for the following reasons.
1. The initial capital cost is high per KWh of capacity.
2. Lifetime is short, requiring some replacements over a 20 year period.
3. Depth of discharge is typically in a range of 60-90%, requiring oversized battery bank.
4. Round trip efficiency has significant losses.
5. Exotic materials that are required for chemical storage may be limited and expensive.
6. Recycling of heavy/toxic materials is an additional cost at the end of life.
7. Careful management and/or maintenance of many individual cells adds additional cost.
8. Sensitive to over-discharge and over-charge.

Considerable research and development is still required on many fronts to produce a chemical storage battery which solves all of the above problems. There are also issues with other known solar energy storage options.

There is a need for an effective option for storing solar energy to meet customer demand which does not coincide with the time and quantity of incoming solar radiation. The need for an effective solar energy storage option is particularly the case for large scale solar energy plants that produce electricity that contributes to local, regional or national electricity supply networks.

The above description and the description of the invention described in International publication WO2012/009764 in the name of the applicant in later sections of the specification are not to be taken as an admission of the common general knowledge in Australia or elsewhere.

SUMMARY OF THE INVENTION

The present invention is based on a realization of the applicant that using (waste or additional) heat from a solar power generation system can be effectively used to enhance the efficiency of electrical energy storage in a compressed air energy storage system.

In general terms, the present invention provides a method of operating a solar energy plant that includes storing solar energy in a compressed air system of the plant. The efficiency of electricity produced from compressed air from the compressed air storage system can be enhanced to a level which matches or exceeds typical electrochemical storage batteries but at substantially lower cost.

More particularly, although not exclusively, the present invention provides a method of operating a solar energy plant that includes storing solar energy in a compressed air system of the plant by:
(a) converting solar energy into electrical energy and using at least part of the electrical energy to operate a compressor of the compressed air system and produce compressed air; and/or
(b) using solar energy as thermal energy that heats compressed air in the compressed air system of the plant.

The solar energy plant may be any suitable plant for producing electricity from solar energy.

The solar energy plant may be a large scale solar energy plant for producing electricity from solar energy for use in local, regional or national electricity supply networks. The term "large scale solar energy plant" is understood herein to mean a plant that receives at least 600 kW, typically at least 700 kW, of solar energy.

The compressed air system may include a compressor for compressing air, a reservoir for storing compressed air under pressure, and a compressed air-driven electrical generator for producing electricity from the energy of the compressed air. With this arrangement, the reservoir can store compressed air that is produced using solar energy and the reservoir can supply compressed air to the electrical generator to produce electricity as required, for example during time periods to meet customer demand which do not coincide with the time and quantity of incoming solar energy.

The method may include recovering stored solar energy as electrical energy from the compressed air system as required.

The method may include recovering stored solar energy as electrical energy from the compressed air system by using high pressure compressed air produced by the compressor to operate the electrical generator of the compressed air system and produce electricity.

The method may include heating air in the compressed air system with heat produced and stored by operating the compressor.

The method may include heating a thermal energy transfer medium with thermal energy produced from solar energy and heating air in the compressed air system via indirect heat exchange relationship with the thermal energy transfer medium.

The method may include storing the thermal energy transfer medium in a storage unit and heating the thermal energy transfer medium by direct exposure to solar energy. Typically, the thermal energy transfer medium in the storage unit is a liquid. By way of example, the thermal energy transfer medium may include water, heat transfer oil or molten salt.

The storage unit may be any suitable vessel for holding the thermal energy transfer medium.

The storage unit may include solid elements such as porous ceramic blocks within the unit to improve the heat storage capacity within the unit and the heat transfer capacity to the thermal energy transfer medium.

The thermal energy transfer medium may be a coolant that forms part of a system, such as a closed system, for cooling solar cells of the solar energy plant. The coolant temperature may be in a range 40 to 250° C. The method may include transferring heat from the coolant to the thermal energy transfer medium in the storage unit via indirect heat exchange relationship. The method may include transferring heat from the coolant to air in the compressed air system via indirect heat exchange relationship. In the case of large scale solar energy plants that receive at least 600 kW of solar energy the amount of heat transferred to coolant for cooling solar cells is substantial, in many instances greater than the amount of electricity generated by the cells, and recovering and using effectively the thermal energy from the coolant is a significant benefit.

The solar energy may be used in other ways indirectly and directly in the present invention to provide thermal energy in the compressed air system.

The use of solar energy as thermal energy that is transferred to the compressed air system improves the electrical energy efficiency of the compressed air system. Conventional compressed air systems typically have low electrical energy efficiencies, typically 50-70%. Traditionally, fossil fuels have been burnt to add heat to compressed air systems in order to increase the output power to match the input power. This adds operational cost and causes pollution. The present invention makes it possible to avoid altogether the use of fossil fuels as a source of heat in the compressed air system.

The use of solar energy as a source of heat makes it possible to increase the recovery of solar energy in a solar generation system, such as a central receiver photovoltaic cell-based system that converts solar energy into electrical energy.

By way of example, the present invention makes it possible to use low grade solar energy produced in a solar generation system that cannot be used effectively for electricity generation or otherwise in the system. The invention provides an opportunity to use the low grade heat, unused heat, or low cost heat as a source of heat in a compressed air system to enhance the electrical energy efficiency of the compressed air storage system.

The present invention provides a solar energy plant for producing electricity from solar energy that includes a compressed air system for storing solar energy captured and converted by the plant.

The solar energy plant may be any suitable plant for producing electricity from solar energy.

The solar energy plant may be a large scale solar energy plant for producing electricity from solar energy for use in local, regional or national electricity supply networks. The method of electricity generation may include concentrating light to a highly efficient photovoltaic receiver which directly produces electricity and waste heat which is captured in the coolant for the photovoltaic cells.

The components of the solar energy plant may be mature technology, robust, inexpensive, large scale, well understood technically, have a long lifetime, and are made of common benign materials.

The compressed air system may include a compressor for compressing air, a reservoir for storing compressed air under pressure, and a compressed air-driven electrical generator for producing electricity from the energy of the compressed air.

The solar energy plant may be adapted to convert solar energy into electrical energy, and the compressor of the compressed air system may be adapted to be powered by at least a part of the electrical energy production of the plant.

The solar energy plant may be adapted to convert at least some solar energy into thermal energy and to use the thermal energy to heat air in the compressed air system.

The solar energy plant may include a thermal energy transfer medium for receiving and being heated by solar energy and for heating compressed air via indirect heat exchange relationship with compressed air.

The solar energy plant may include a storage unit for the thermal energy transfer medium, and the thermal energy transfer medium may be in indirect heat exchange relationship with air in the compressed air system.

The storage unit and the thermal energy transfer medium in the storage unit may be adapted to be heated directly by solar energy.

The storage unit may be any suitable vessel for holding the thermal energy transfer medium.

The storage unit may include solid elements such as porous ceramic blocks within the unit to improve the heat storage capacity within the unit and the heat transfer capacity to the thermal energy transfer medium.

The solar energy plant may include a coolant system for cooling a solar cell assembly for converting solar energy into electrical energy. In effect, in use, the coolant system extracts thermal energy that is produced by solar energy impinging on the solar cell assembly and thereby maintains the solar cell assembly at optimum operating temperatures. A coolant of the coolant system may be the thermal energy transfer medium. The coolant system may be in heat exchange relationship with air in the compressed air system. The coolant system may be a closed system.

The solar energy plant may be a central receiver concentrator photovoltaic plant that includes:

(a) a mirror collector for collecting solar energy and selectively directing collected solar energy, and (b) a receiver for receiving solar energy from the mirror collector and (i) transferring solar energy for use directly or indirectly as solar energy in the compressed air system and/or (ii) converting solar energy into electrical energy for use in the compressed air system.

The term "mirror collector" is understood herein to cover any device that has a reflective surface that can collect and re-direct solar energy and includes, by way of example, heliostats and Fresnel mirrors. The term "mirror collector" may include arrangements that re-direct and/or concentrate solar energy.

The central receiver concentrator photovoltaic plant may use concentrated sunlight from a field of heliostats to activate an array of high efficiency photovoltaic solar cells mounted on an appropriately-positioned photovoltaic (PV) receiver. Typically, in known plants of this type, 30-35% of the incident light is converted by the solar cells into electricity, 10% of the incident light is reflected off the cell face and is lost, and the remaining 55-60% of the incident light is captured as heat in a working fluid used to cool the solar cells. It can be appreciated that the amount of heat is substantial in the case of large scale solar energy plants that receive at least 600 kW of solar energy.

The applicant has realised that the temperature of heat extracted at different points in the energy flow in the above-described central receiver concentrator photovoltaic plant may be used beneficially in the compressed air system.

The applicant has realised that by choosing appropriate points in the energy flow in the central receiver concentrator photovoltaic plant it is possible to extract heat at higher temperatures and thereby increase overall system efficiency. Extraction of heat at a higher temperature improves the use of heat in the compressed air system.

Possible heat extraction points include the following points.

1. Heat collected by a coolant used to cool photovoltaic cells which are receiving concentrated sunlight (temperature range typically 35-90° C. and possibly up to 250° C.). This energy is captured heat at low temperature (typically less than 250° C.) and has been regarded as being of little use unless the solar power plant is close to industry with processes which can use this heat. The need to cool the solar cells means that solar energy is captured as heat in the coolant at a relatively low temperature. The present invention uses the energy which gives rise to this low grade heat beneficially in the compressed air system.

2. Unused parts of the solar spectrum that is not captured by photovoltaic cells. This energy may be separated and redirected via suitable selective reflectors or absorbers and optic systems to heat a heat transfer medium (temperature range up to 1000° C.). One example of a selective reflector is a spectrum splitter that redirects longer wavelength energy to a thermal storage unit and allows shorter wavelength energy to pass through the splitter and impinge on solar cells. Examples of optical systems include optical elements which are spectrally selective and have a form by way of example which is Cassegranian, Gregorian or Fresnel. Light guide elements may also be used.

3. Solar energy that is reflected from the cell face.

4. Portions of the concentrated solar energy which make a greater contribution to the value of the total system output by being directed to a thermal receiver (temperature range up to 1000° C.). This energy may be collected by way of example via a separate receiver or a thermal element within the PV receiver.

5. Additional mirror collectors (such as heliostats and dish collectors) for collecting solar energy and selectively directing collected solar energy at receivers to achieve an optimal balance of thermal energy and electrical energy.

6. Secondary mirror collectors (sometimes described as "flux modifiers") that are added to contribute to achieving an optimal balance of thermal energy and electrical energy. Where a receiver has such a "flux modifier" associated with a receiver for receiving solar energy from the mirror collector or otherwise incident on the secondary mirror collector, the "flux modifier" tends to run at high temperature, for example as a consequence of absorbing longer wavelength radiation. This absorbed solar energy is a source of heat. The "flux modifiers" may be formed to increase effective absorption of solar energy without depleting solar energy that is available for photovoltaic solar cells of the receiver.

The thermal energy collected from items 1, 2, 3, 4, 5 or 6 above may be stored in storage units, for example in the form of insulated vessels containing a suitable thermal energy transfer medium such as molten salt at suitable temperatures, until the optimum time for use. By way of example, an optimum time may be during periods when there is no or very low amounts of available solar energy for the plant. The heat may be transferred into an appropriate part or parts of the compressed air system. Heat produced in the compression part of the compressed air system may also be stored in these tanks. This means that it is possible to supply all of the heat required to augment the thermodynamic output of the compressed air system such that electrical energy output equals (or exceeds) the electrical energy input required to operate the system. This avoids the use of fossil fuels required in conventional compressed air systems and provides an effective "no loss" and pollution-free storage system. In effect, the energy inefficiencies of the compressed air system are compensated for by waste heat from the solar plant.

The solar plant of the present invention may include a photovoltaic receiver for transferring solar energy for use directly or indirectly as solar energy in the compressed air system and a thermal receiver for transferring solar energy for use directly or indirectly as solar energy in the compressed air system.

The solar plant of the present invention may include any one or more of the following features described in detail in International publication WO2012/009764 in the name of the applicant (the whole disclosure of which is incorporated herein by cross-reference):

(a) a photovoltaic receiver and a thermal receiver mounted on one receiver tower in spaced-apart relationship so that the operation of one receiver does not interfere with the operation of the other receiver and vice versa, with each receiver having target areas for receiving solar energy from the mirror collector, (b) a primary receiver in the form of a photovoltaic cell receiver for receiving solar energy from the mirror collector and a secondary receiver in the form of a thermal receiver for receiving solar energy reflected or re-directed from the primary receiver, and (c) a photovoltaic cell receiver and a thermal receiver each of which has a separate target area, with the photovoltaic cell receiver and the thermal receiver being positioned so that the separate target areas form part of a single target area for receiving solar energy from the mirror collector and thereby forming a multi-type receiver, and with the receivers being selected on the basis of optimising the operation limits and responsiveness of the receiver to the flux intensity that is incident on respective zones of the single target area.

With regard to item (a) above, the spacing may be selected to be sufficient so that there is no heating or any other unwanted or undesirable influence of one receiver on the other receiver, including components of the receiver such as electrical wiring that causes a loss of performance of the receiver.

With regard to item (c) above, typically, solar energy that is concentrated from a number of collectors, such as heliostats, to a single target area will have a solar flux distribution that has solar flux intensities that increase from the perimeter to the centre of the target area. As described in International publication publication WO2012/009764, differences in the responsiveness of different receivers to different flux intensities in such a distribution provides an opportunity to form a single target area that, in effect, has different receiver elements (i.e. different types of sub-receivers) that are optimized for the flux intensities incident on the target area and form, in effect, a multi-type receiver. By way of example, the applicant has recognized that the differences in the operation limits and responsiveness of thermal receivers and photovoltaic cell receivers (and other types of receivers) to flux intensities provides an opportunity to use thermal receivers and photovoltaic receivers in different zones of a single target area, where the zones have different flux intensities. The term "operation limits and responsiveness" of receivers is understood herein to mean factors that are relevant to operation limits such as energy intensity, variation in energy intensity across a zone of a target area, temperature, current density, thermal conductance, and coolant flow rate and factors that are relevant to responsiveness such as ability to capture energy, receiver cost, conversion efficiency, and the value of energy. By way of example, one factor that may be relevant to a greater of lesser extent in different situations is the responsiveness of receivers to variations in energy intensity across a zone of a target area.

BRIEF DESCRIPTION OF THE DRAWINGS

The present invention is described further by way of example with reference to the accompanying drawings, of which.

DETAILED DESCRIPTION OF THE INVENTION

The embodiments of the solar energy plant in accordance with the invention shown in the Figures are combinations of central receiver concentrator photovoltaic plants and compressed air systems.

Figure 1:
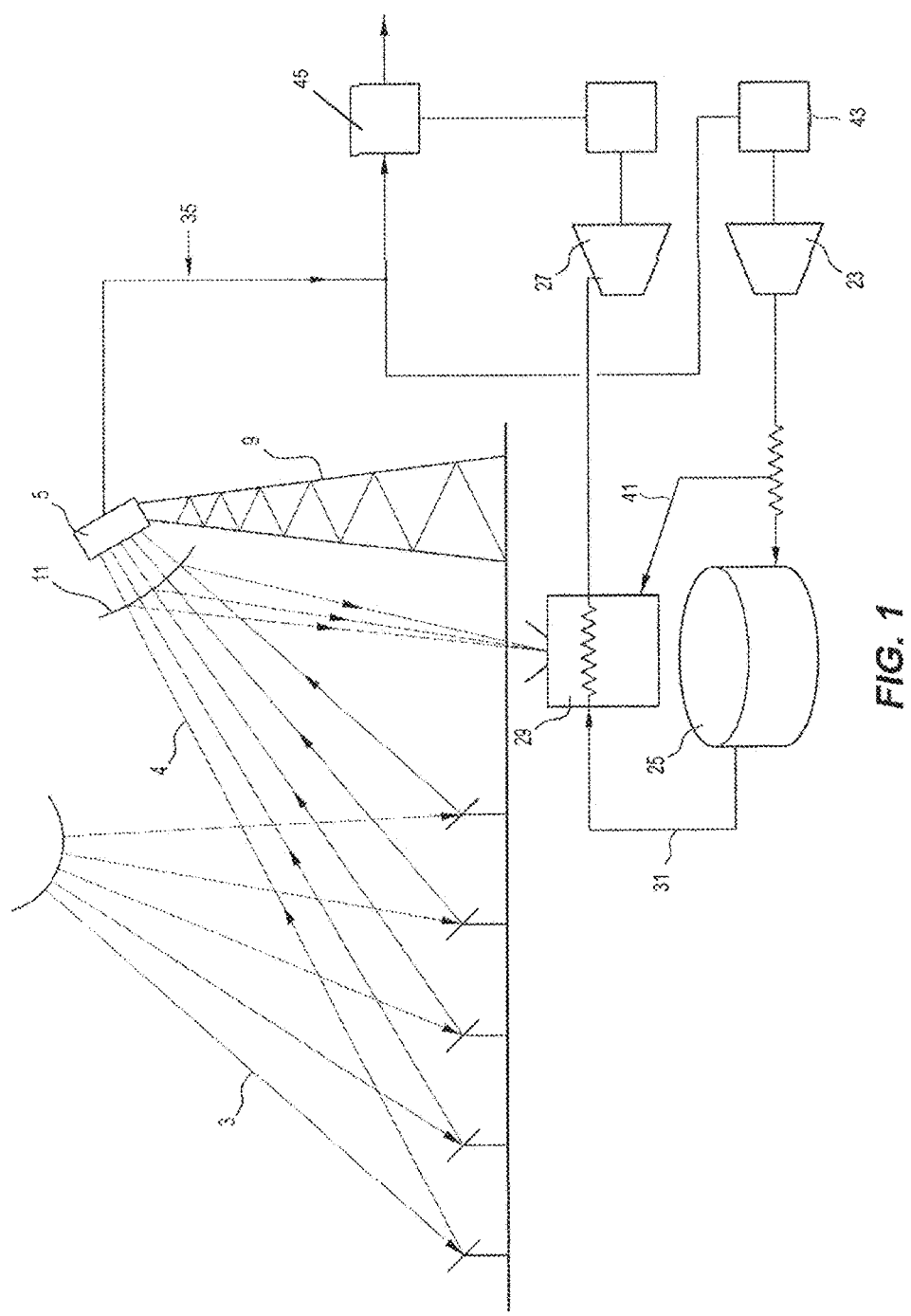
FIG. 1 is a side elevation, in a very simplified and diagrammatic form, of one embodiment of a solar energy plant in accordance with the present invention.

The solar energy plant shown in FIG. 1 includes a plurality of mirror collectors in the form of heliostats 3 that are arranged in an array on a given area. The array may be any suitable array. Each collector 3 is arranged so that the orientation of the collector 3 can be changed to track the movement of the Sun and to reflect and to concentrate solar energy that contacts the collectors 3. The Sun tracking system may be any suitable system.

The plant also includes a tower 9 and a solar energy receiver 5 in the form of a photovoltaic receiver located on the tower 9. The receiver 5 is arranged to receive solar energy from the collectors 3. The receiver 5 is not illustrated in detail in the Figure other than in a very diagrammatic form. The receiver 5 includes an array of photovoltaic solar cells for converting solar energy into electrical energy. The electrical energy is transferred via an electrical circuit generally identified by the numeral 35 for use as described further below.

The plant also includes a spectrum splitter 11 that allows shorter wavelength radiation to pass through the splitter 11 to contact the photovoltaic cells of the receiver 5 and reflects longer wavelength radiation to another location, such as in this instance downwardly toward the ground. The longer wavelength radiation is a source of high temperature thermal energy.

The plant also includes a thermal storage unit 29 in the form of an insulated vessel with an upper section that is transparent to longer wavelength radiation that contains a thermal energy transfer medium, for example molten salt. The storage unit 29 is positioned in line with the reflected longer wavelength radiation from the spectrum splitter 11 so that molten salt is heated by the reflected longer wavelength radiation. The longer wavelength radiation is a source of high temperature thermal energy. In effect, the storage unit 29 and the molten salt are a form of solar energy receiver. The storage unit 29 may include solid elements such as porous ceramic blocks within the unit to improve the heat storage capacity within the unit and the heat transfer capacity to the thermal energy transfer medium.

The plant also includes a compressed air system that includes a compressor 23 for compressing air, a motor 43 for powering the compressor 23, a reservoir 25 for storing compressed air produced in the compressor 23 under pressure, and a compressed air-driven electrical generator 27 for producing electricity from the energy of the compressed air. The electrical generator 27 is in the form of an air-driven turbine that produces electricity. The electricity is transferred to a power conditioning unit 45 and then into a local or regional or national electricity grid. The motor 43 of the compressor 23 is powered by at least a part of the electrical energy produced by the photovoltaic solar cells of the receiver 5 and transferred via the electrical circuit 35. The compressed air system also includes a pipe 31 that connects the reservoir 25 to an expansion chamber (not shown) of the electrical generator 27. The pipe 31 is arranged to pass through the thermal storage unit 29 so that compressed air is heated by indirect heat exchange with molten salt (or other thermal storage means) as it flows in the pipe 31 through the storage unit 29 from the reservoir 25 to the electrical generator 27.

The compressed air system is also arranged to transfer heat generated by the compressor 23 to the molten salt in the thermal storage unit 29. This is illustrated by the line 41.

In use, the solar energy plant:
(a) converts solar energy into electrical energy via the photovoltaic cells of the receiver 5, and the electrical energy powers the motor 43 and operates the compressor 23 of the compressed air system and produces compressed air; and
(b) uses solar energy as thermal energy that heats air in the compressed air system of the plant; and
(c) uses the heated compressed air to generate electricity in the electrical generator 27.

More particularly, the compressed air system is a viable option for storing solar energy as compressed air (via the compression process) and heat and converting the stored energy and heat, i.e. as heated compressed air, into electrical energy as required. In addition, the combination of the central receiver concentrator photovoltaic plant and the compressed air system makes it possible to optimise the use of solar energy by using beneficially and therefore taking advantage of thermal energy produced in the plant. In later-described embodiments of the invention, and also in an embodiment based on the FIG. 1 embodiment, in addition to direct use of solar energy as thermal energy described above, heat extracted by coolant used to cool the solar energy receiver 5.

The electrical circuit 35 transfers that part of the electricity from the photovoltaic cells of the receiver 5 that is not used to power the motor 43 of the compressed air system to the power conditioning unit 45.

Figure 2:
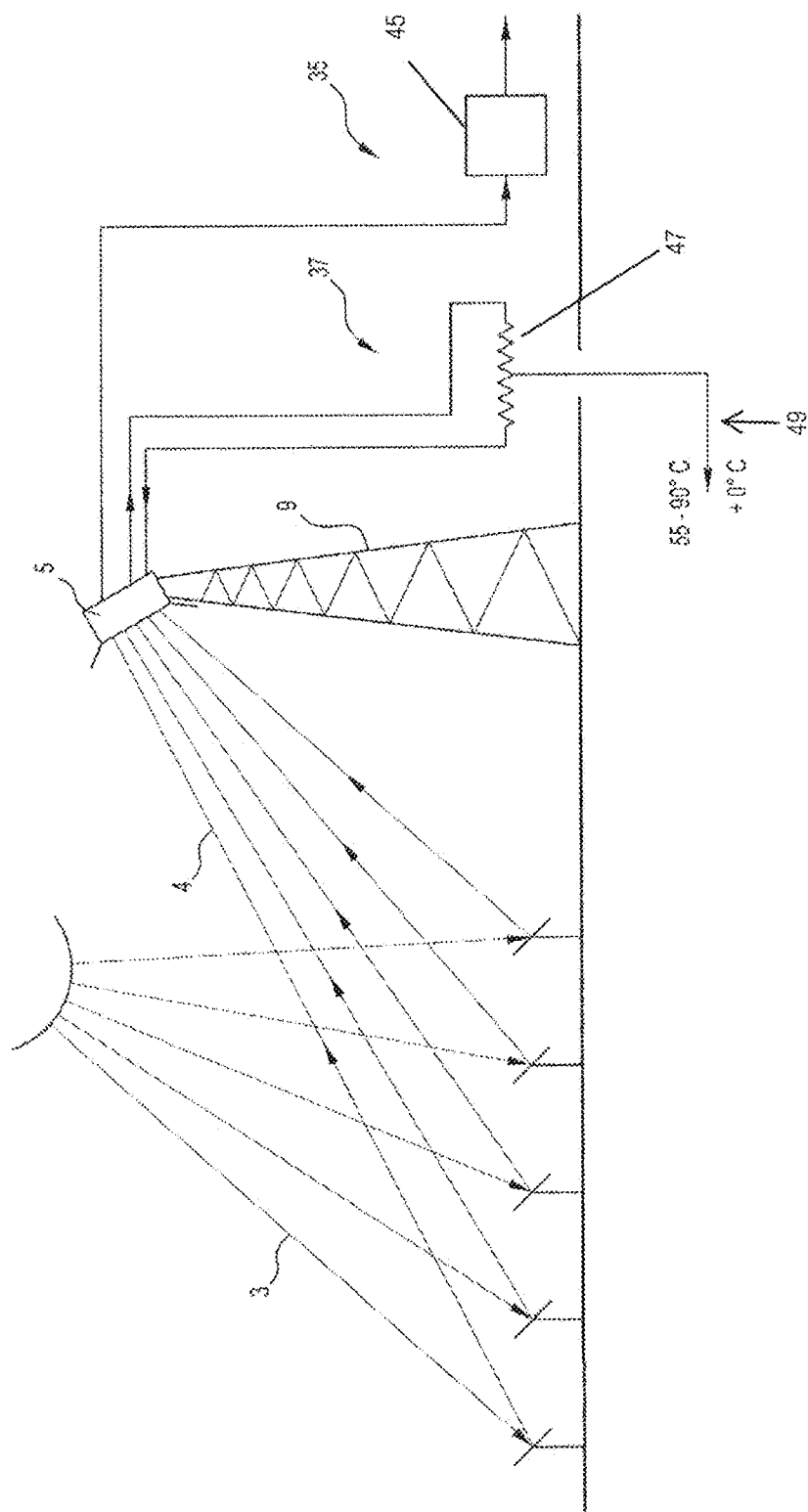
FIG. 2 is a side elevation, in a very simplified and diagrammatic form, of another (although not the only other) embodiment of a solar energy plant in accordance with the present invention.

The solar energy plant shown in FIG. 2 has the same basic components as the plants shown in FIG. 1 and the same reference numerals are used to describe the same components.

The plant shown in FIG. 2 comprises a plurality of mirror collectors in the form of heliostats 3 that are arranged in an array. The array may be any suitable array. Each collector 3 is arranged so that the orientation of the collector 3 can be changed to track the movement of the Sun and to reflect and to concentrate solar energy that contacts the collectors 3. The Sun tracking system may be any suitable system.

The plant includes a tower 9 and a solar energy receiver 5 in the form of a photovoltaic receiver located on the tower 9. The receiver 5 is not illustrated in detail in the Figure other than in a very diagrammatic form. The receiver 5 includes an array of photovoltaic solar cells for converting solar energy into electrical energy. The electrical energy is transferred via an electrical circuit generally identified by the numeral 35 and a power conditioning unit 45 to a local or regional or national electricity grid.

Whilst not shown in FIG. 2, the plant includes the storage unit 29 containing molten salt (or another thermal storage means) and the compressed air system shown in FIG. 1. In addition, the compressed air system transfers electrical energy stored in the compressed air system to the power conditioning unit 45 as required to be used in the local or regional or national electricity grid.

The plant does not include a spectrum splitter 11 that reflects a part of the solar energy to the storage unit 29 for use as thermal energy to heat the thermal energy transfer medium, e.g. molten salt.

In the FIG. 2 embodiment, the receiver 5 is arranged to receive all of the solar energy from the collectors 3, and the heat that is required for the compressed air system is obtained from thermal energy recovered from coolant in a coolant system for cooling the photovoltaic solar cells of the photovoltaic receiver 5. In this embodiment, the coolant is the thermal energy transfer medium. The coolant flows in a closed loop circuit 37 through and back to the receiver 5 and is heated as it flows through the receiver 5. The circuit 37 also includes a heat exchanger 47 that extracts heat from the coolant and thereby cools the coolant before the coolant flows back to the receiver 5. The extracted heat from the heat exchanger 47 is transferred via a heat transfer system 49 to the compressed air system, for example to the molten salt storage unit 29, and contributes heat to the thermal storage medium (e.g. molten salt).

The use of heat from the coolant, which is low temperature thermal energy (typically 50-90° C. for standard photovoltaic solar cells), in the compressed air system is effective use of thermal energy that otherwise would be waste heat. It is noted that it is possible to operate photovoltaic solar cells at up to 250° C. A special case of this is where specially optimized cells, modules and receiver are designed to operate under these conditions while maintaining acceptable performance. In this case heat could be extracted at 240° C.

In another embodiment of the invention based on FIG. 2, a part of the electrical energy produced by the photovoltaic solar cells of the receiver 5 is transferred to the compressed air system and powers the motor 43 of the compressor 23.

Figure 3:
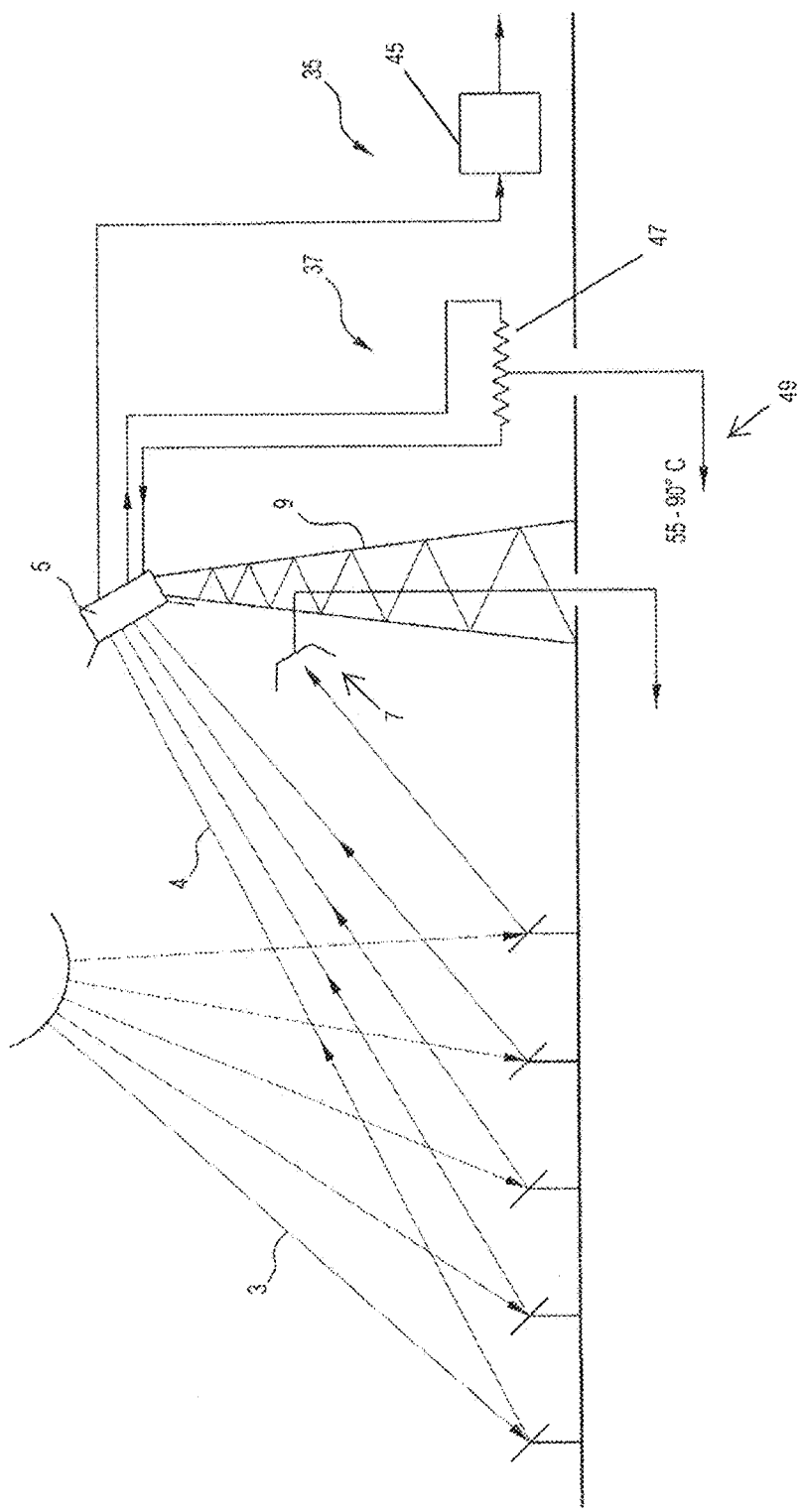
FIG. 3 is a side elevation, in a very simplified and diagrammatic form, of another (although not the only other) embodiment of a solar energy plant in accordance with the present invention.

The solar energy plant shown in FIG. 3 is identical to the plant shown in FIGS. 1 and 2 in terms of the basic components of the plant and the same reference numerals are used to describe the same components.

The plant includes a tower 9 and an upper solar energy target 5 and a lower solar energy target 7 that are located on the tower 9 to receive solar energy from the collectors 3. More specifically, in addition to being operable to track the Sun, each collector 3 is arranged so that the orientation of the collector can be changed to direct solar energy selectively at one or other of the upper target 5 or the lower target 7.

The targets 5, 7 form part of separate solar energy receivers.

The receivers are not illustrated in detail in the Figure other than in a very diagrammatic form. The upper receiver 5 includes an array of photovoltaic solar cells for converting solar energy into electrical energy. The lower receiver 7 is a thermal receiver for converting solar energy into thermal energy. The FIG. 3 embodiment extracts thermal energy from both receivers 5, 7 and uses the thermal energy in a compressed air system.

The receivers 5, 7 are spaced apart vertically in the embodiment of FIG. 3 but could be spaced apart horizontally or in any other suitable arrangement. The separation distance is selected so that the operation of one receiver does not interfere with the operation of the other receiver and vice versa. In particular, the spacing between the receivers is selected to ensure that heat generated by one receiver does not have an impact on the performance of the other receiver, and vice versa.

Whilst not shown in FIG. 3, the plant includes the storage unit 29 containing a thermal storage medium (e.g. molten salt) and the compressed air system shown in FIG. 1. In addition, the compressed air system transfers electrical energy generated in the compressed air system to the power conditioning unit 45 to be used in the local or regional or national electricity grid.

The plant does not include a spectrum splitter 11 that reflects a part of the solar energy to the storage unit 29. Instead, the plant uses the thermal energy from the thermal energy receiver 7 as thermal energy for the compressed air system. As is the case with the splitter 11 in the FIG. 1 embodiment, the thermal energy receiver 7 is a source of high temperature thermal energy.

The FIG. 3 embodiment, in the same way as the FIG. 2 embodiment, takes advantage of the heat in the coolant used to cool the receiver 5 as a source of low temperature thermal energy (typically 50-90° C. for standard photovoltaic solar cells) for the compressed air system. Specifically, the coolant is a thermal energy transfer medium and flows in a closed loop circuit 37 through and back to the receiver 5 and is heated as it flows through the receiver 5. The circuit 37 also includes a heat exchanger 47 that extracts heat from the coolant and thereby cools the coolant before the coolant flows back to the receiver 5. The extracted heat from the heat exchanger 47 is transferred via a heat transfer system 49 to the compressed air system, for example to the thermal storage medium (e.g. molten salt) storage unit 29, and contributes heat to the thermal storage medium.

In another embodiment of the invention based on FIG. 3, high temperature thermal energy is used to increase the temperature of the low temperature thermal energy and the output thermal energy is used in the compressed air system.

In another embodiment of the invention based on FIG. 3, a part of the electrical energy produced by the photovoltaic solar cells of the receiver 5 is transferred to the compressed air system and powers the motor 43 of the compressor 23 to store energy as compressed air.

Figure 4:
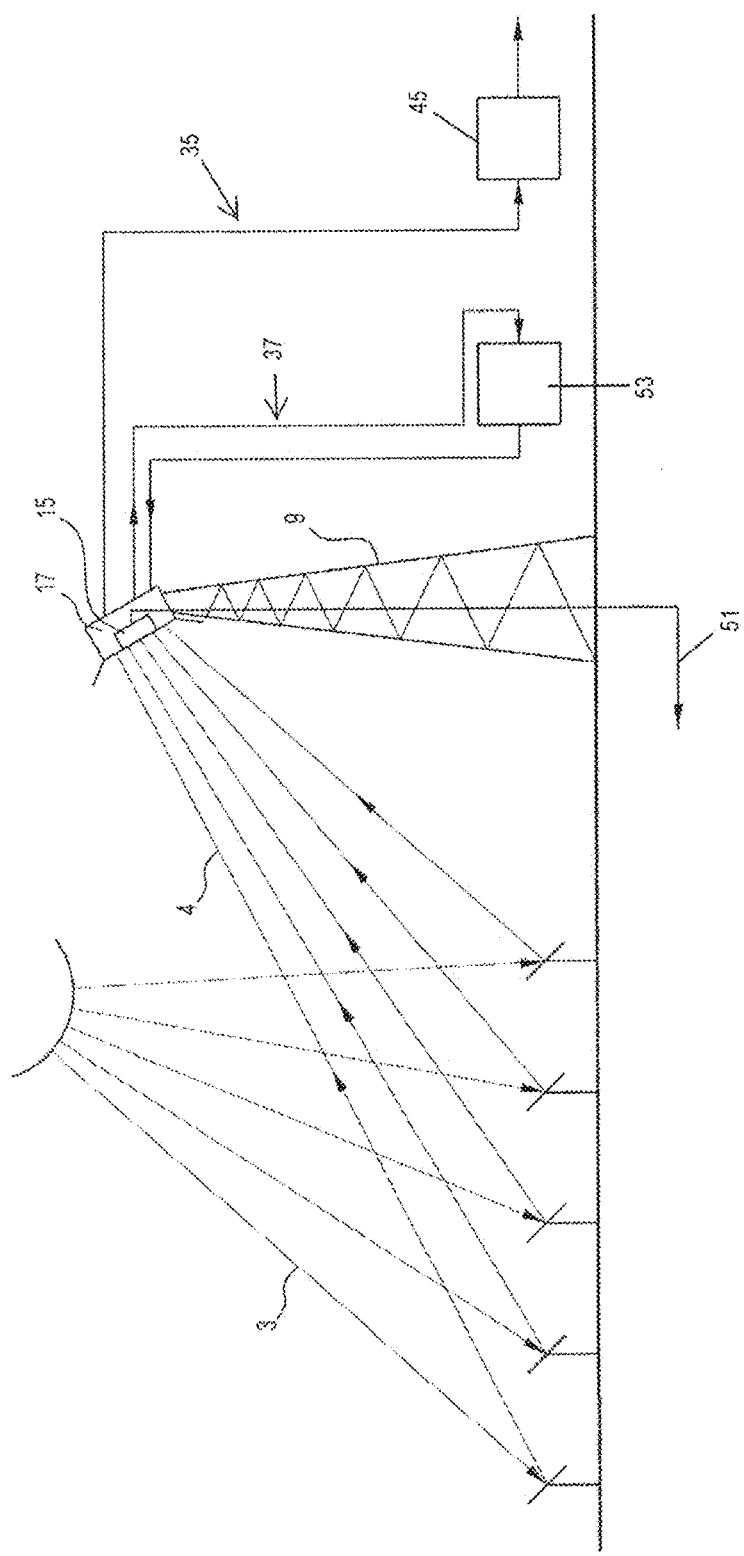
FIG. 4 is a side elevation, in a very simplified and diagrammatic form, of another (although not the only other) embodiment of a solar energy plant in accordance with the present invention.

The solar energy plant shown in FIG. 4 has the same basic components as the plants shown in FIGS. 1 to 3 and the same reference numerals are used to describe the same components.

The plant shown in FIG. 4 comprises a plurality of mirror collectors in the form of heliostats 3 that are arranged in an array. The array may be any suitable array. Each collector 3 is arranged so that the orientation of the collector 3 can be changed to track the movement of the Sun and to reflect and to concentrate solar energy that contacts the collectors 3. The Sun tracking system may be any suitable system.

The plant also includes a tower 9 and a solar energy receiver 5.

The receiver 5 is a combination of two different types of receiving elements that have separate target areas that form a single receiver target area. The two different types of receiving elements are not illustrated in detail in the Figure other than in a very diagrammatic form. A central zone 15 of the receiver 5 is a receiver in the form of a solar-thermal absorber for converting solar energy into thermal energy.

The thermal energy, which typically is high temperature thermal energy, is transferred away from the target area to the compressed air system (not shown in this Figure, but shown in FIG. 1). The thermal energy transfer is indicated by the line 51 in the Figure. An outer zone 17 that makes up the balance of the receiver 5 is in the form of a photovoltaic assembly that converts solar energy into electrical energy at the receiver. The electrical energy is transferred via electrical circuit 35 to the power conditioning unit 45.

The receiving elements in the zones 15, 17 may take the form of 'modules' which have a common compatible form and are designed to be of appropriate size and configuration to facilitate practical implementation of the 'multi-type' receiver. The zones 15, 17 and, more particularly, the selection of the different types of receiving elements for the zones, are based on optimising the use of the solar energy on the target area. In other words, the selection of the receiving elements for the zones 15, 17 is driven by the solar energy that is incident on the zones rather than by a preference for one type of receiver over another type of receiver.

The FIG. 4 embodiment, in the same way as the FIGS. 2 and 3 embodiments, takes advantage of the heat in the coolant used to cool the receiver 5 as a source of low temperature thermal energy (typically 50-90° C. for standard photovoltaic solar cells) for the compressed air system. Specifically, the coolant is a thermal energy transfer medium and flows in a closed loop circuit 37 through and back to the receiver 5 and is heated as it flows through the receiver 5. The circuit 37 also includes a heat extraction unit 53 that extracts heat from the coolant and thereby cools the coolant before the coolant flows back to the receiver 5. The extracted heat from the heat extraction unit 53 is transferred via a heat transfer system (not shown) to the compressed air system, for example to the thermal storage medium (e.g. molten salt) storage unit 29, and contributes heat to the thermal storage medium.

Whilst not shown in FIG. 4, the plant includes the storage unit 29 containing a storage medium (e.g. molten salt) and the compressed air system shown in FIG. 1. In addition, the compressed air system transfers electrical energy generated in the compressed air system to the power conditioning unit 45 to be used in the local or regional or national electricity grid.

The plant does not include a spectrum splitter 11 that reflects a part of the solar energy to the storage unit 29. Instead, the plant uses the thermal energy from the receiver in zone 15 of the receiver 5 as thermal energy for the compressed air system. As is the case in the FIG. 1 embodiment, the thermal energy is high temperature thermal energy. The plant also uses the low temperature thermal energy form the coolant circuit 37. In this context, the FIG. 4 embodiment is an alternative to the FIG. 3 embodiment in that it uses high temperature and low temperature thermal energy.

In another embodiment of the invention based on FIG. 4, a part of the electrical energy produced by the photovoltaic solar cells of the receiver 5 is transferred via the electrical circuit 35 to the compressed air system and powers the motor 43 of the compressor 23.

In another embodiment of the invention based on FIG. 4, in the same way as the FIGS. 2 and 3 embodiments, the embodiment takes advantage of the heat in the coolant used to cool the receiver 5 as a source of low temperature thermal energy (typically 50-90° C. for standard photovoltaic solar cells) for the compressed air system.

Many modifications may be made to the present invention described above without departing from the spirit and scope of the invention.

By way of example, whilst not described, the receivers shown in the Figures may comprise an optical element, such as a mirror, that is associated with a receiver that absorbs some solar energy at high temperature and directs the remainder of the solar energy that is incident on the element onto the target area of the receiver or onto the target area of another receiver.

The invention claimed is:

1. A method of operating a solar energy plant comprising:
collecting and concentrating solar energy from a plurality of mirror collectors,
converting part of the concentrated solar energy into electrical energy via photovoltaic cells and operating a compressor of a compressed air system and producing compressed air, storing the compressed air under pressure in a compressed air storage reservoir, and using another part of the concentrated solar energy as thermal energy, heating a thermal energy transfer medium comprising a coolant for cooling solar cells of the solar energy plant with thermal energy produced from the concentrated solar energy, heating compressed air in the compressed air system via indirect heat exchange relationship with the thermal energy transfer medium and thereby storing solar energy in the compressed air system, and recovering stored solar energy as electrical energy from the compressed air system by using pressurized air produced by the compressor and stored in the compressed air storage reservoir to operate an electrical generator run by the compressed air system and produce electricity.

2. The method defined in claim 1 includes heating air in the compressed air system with heat produced by operating the compressor.

3. The method defined in claim 1 includes storing another thermal energy transfer medium in a storage unit and heating the other thermal energy transfer medium by direct exposure to the concentrated solar energy, and heating air in the compressed air system via indirect heat exchange relationship with the other thermal energy transfer medium.

4. The method defined in claim 3 wherein the other thermal energy transfer medium is the coolant for cooling solar cells of the solar energy plant, and the method includes transferring heat from the coolant to the thermal energy transfer medium in the storage unit via indirect heat exchange relationship.

5. A solar energy plant adapted to collect and concentrate solar energy and convert part of the concentrated solar energy into electrical energy via photovoltaic cells and another part of the concentrated solar energy into thermal energy, wherein the plant includes a solar cell assembly for converting solar energy into electrical energy, a coolant system for cooling the solar cell assembly by extracting thermal energy that is produced by solar energy impinging on the solar cell assembly, a compressed air system for storing solar energy, wherein the compressed air system includes a compressor for compressing air, a reservoir for storing compressed air under pressure, and a compressed air-driven electrical generator for producing electricity from the energy of the compressed air stored in the reservoir under pressure, with the compressor being adapted to be powered by at least a part of the electrical energy production of the plant, and with the coolant of the coolant system being in heat exchange relationship with air in the compressed air system and being a thermal energy transfer medium for heating compressed air via indirect heat exchange relationship.

6. The solar energy plant defined in claim 5 includes a storage unit for the thermal energy transfer medium.

7. The solar energy plant defined in claim 6 wherein the storage unit and the thermal energy transfer medium in the storage unit are adapted to be heated directly by solar energy.

8. The solar energy plant defined in claim 5 comprising:
   (a) a mirror collector for collecting solar energy and selectively directing collected solar energy, and
   (b) a receiver for receiving solar energy from the mirror collector and (i) transferring solar energy for use directly or indirectly as solar energy in the compressed air system and/or (ii) converting solar energy into electrical energy via photovoltaic cells for use in the compressed air system.

* * * * *